United States Patent
Hadef et al.

(10) Patent No.: US 8,085,749 B2
(45) Date of Patent: Dec. 27, 2011

(54) CHAOTIC SPREADING CODES AND THEIR GENERATION

(75) Inventors: Mahmoud Hadef, Staines (GB); Josh Reiss, London (GB); Xiaodong Chen, London (GB)

(73) Assignee: European Union (BE)

( * ) Notice: Subject to any disclaimer, the term of this patent is extended or adjusted under 35 U.S.C. 154(b) by 417 days.

(21) Appl. No.: 12/516,928

(22) PCT Filed: Nov. 30, 2007

(86) PCT No.: PCT/EP2007/063080
§ 371 (c)(1),
(2), (4) Date: May 29, 2009

(87) PCT Pub. No.: WO2008/065191
PCT Pub. Date: Jun. 5, 2008

(65) Prior Publication Data
US 2010/0054225 A1 Mar. 4, 2010

(30) Foreign Application Priority Data
Dec. 1, 2006 (LU) .......................................... 91292

(51) Int. Cl.
*H04B 7/216* (2006.01)
(52) U.S. Cl. ........................................ 370/342; 370/335
(58) Field of Classification Search .................. 370/335, 370/342, 441, 203, 316
See application file for complete search history.

(56) References Cited

U.S. PATENT DOCUMENTS

| 5,321,409 | A | 6/1994 | Walker | |
|---|---|---|---|---|
| 6,999,966 | B2* | 2/2006 | Liang et al. | 1/1 |
| 7,203,685 | B2* | 4/2007 | Abdo et al. | 707/713 |
| 7,974,413 | B2* | 7/2011 | Chester et al. | 380/263 |
| 8,005,221 | B2* | 8/2011 | Chester et al. | 380/263 |
| 2007/0185851 | A1* | 8/2007 | Bruno et al. | 707/4 |
| 2011/0134890 | A1* | 6/2011 | Fodor | 370/335 |

OTHER PUBLICATIONS

D. Flachs, et al. "Galileo Signal in Space Interface Control Document (SIS-ICD), Ver. 10.1," Galileo Industries Sep. 28, 2005.
S. Wallner, "Consolidated Code Design (TN ID31)," Galileo Phase C0 / CN001, Nov. 10, 2004.

(Continued)

*Primary Examiner* — Brian Nguyen
(74) *Attorney, Agent, or Firm* — Cantor Colburn LLP

(57) ABSTRACT

Generation of a set of spreading codes starts with determining first and second chaotic pseudo-random noise codes having delta-peak-like autocorrelation functions and a low cross-correlation function. Further codes are obtained by the steps: (a) generating a further pseudo-random noise code by computing $D_k = F(C_1) + T^k C_2 + F(C_2)$, where k represents a positive integral index, $D_k$ the generated pseudo-random noise code, $C_1$ the first code, $C_2$ the second code, F a binary function based on basic binary operations and $T^k$ the operator cyclically shifting a code by k chip positions; (b) adding code $D_k$ to the set of already determined pseudo-random noise codes if it has a delta-peak-like autocorrelation and low cross-correlation functions with the pseudo-random noise codes already determined; (c) discarding code $D_k$ if the conditions of step (b) are not satisfied; (d) modifying index k and repeating steps (a)-(d) until the cardinal number of the set of determined pseudo-random noise codes reaches the cardinal number of the set of spreading codes to be generated.

9 Claims, 9 Drawing Sheets

OTHER PUBLICATIONS

V. Varadan and H. Leung, "Design of Piecewise Maps for Chaotic Spread-Spectrum Communications Using Genetic Programming," IEEE Transactions on Circuits and Systems I: Fundamental Theory and Applications, vol. 49, pp. 1543-1553, 2002.

G. Mazzini, G. Setti, and R. Rovatti, "Chaotic complex spreading sequences for asynchronous DS-CDMA—Part I: System modeling and results," IEEE Transactions on Circuits and Systems I: Fundamental Theory and Applications, vol. 44, pp. 937-947, 1997.

D. Yoshioka, A. Tsuneda, and T. Inoue, "On Transformation between Discretized Bernoulli and Tent Maps," IEICE TRANS, Fundamentals, vol. E88-A, 2005.

T. Kohda and A. Tsuneda, "Statistics of chaotic binary sequences," IEEE Trans. Inf. Theory, vol. 43, pp. 104-112, 1997.

A. L. Baranovski, F. Dachselt, and W. R.. "Nonlinear dynamics of PNsequences," Proceedings of the IST Mobile & Wireless Communications Summit 2005.

A. L. Baranovski, "On Generation of Chaotic M-Sequences," Proceedings of the International Symposium on Nonlinear Theory and its Applications (NOLTA), Bruges, Belgium, 2005.

D. Yoshioka, A. Tsuneda, and T. Inoue, "An algorithm for the generation of maximal-period sequences based on one-dimensional chaos maps with finite bits," IEICE Trans. Fundamentals, vol. E87-A, No. 6, pp. 1371-1376, Jun. 2004.

A. L. Baranovski and A. J. Lawrance, "Sensitive parameter dependence of autocorrelation function in piecewise linear maps," International Journal of Bifurcations and Chaos, 2006.

F. Soualle, et al., "Spreading Code Selection Criteria for the future GNSS Galileo," Proceedings of the GNSS 2005, Munich, 2005.

Stephane Penaud, et al. "Potentialites des sequences d'etalement chaotiques pour l'amelioration du TEEB d'un systeme DS-CDMA asynchrone", Annales des Telecommunication, vol. 58 No. 3-4, 2003.

Alireza Mirzaee, et al. "Design of a New Class of Spreading Sequence Using Chaotic Dynamical Systems for Asynchronous DS-CDMA Applications", Computers and Communications 2004, vol. 2, pp. 720-724.

Tohru Kohda, et al. "Pseudonoise Sequences by Chaotic Nonlinear Maps and Their Correlation Properties.", IEICE Transactions on Communications, Communications Society, Tokyo Japan, Aug. 1, 1993, vol. E76, No. 8, pp. 855-862, XP000396888.

R. Rovatti, et al., "Chaotic complex spreading sequences for asynchronous DS-CDMA—Part II:Some Theoretical Performance Bounds," IEEE Transactions on Circuits and Systems I: Fundamental Theory and Applications, vol. 45, No. 4, pp. 497-505, 1998.

International Search Report PCT/EP2007/063080; Dated May 6, 2008.

* cited by examiner

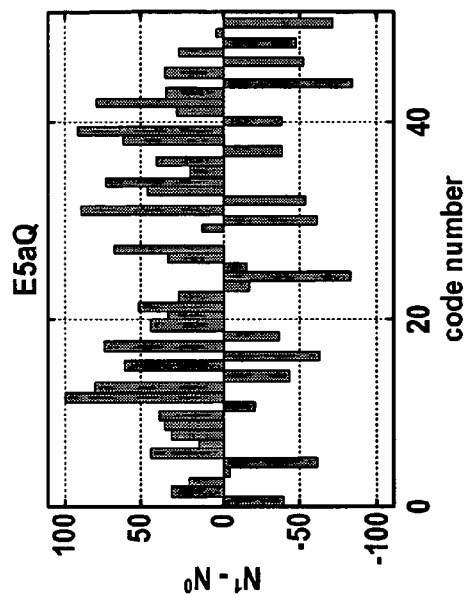
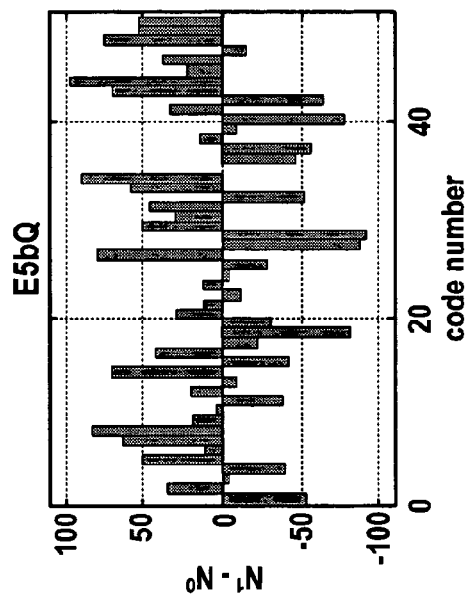
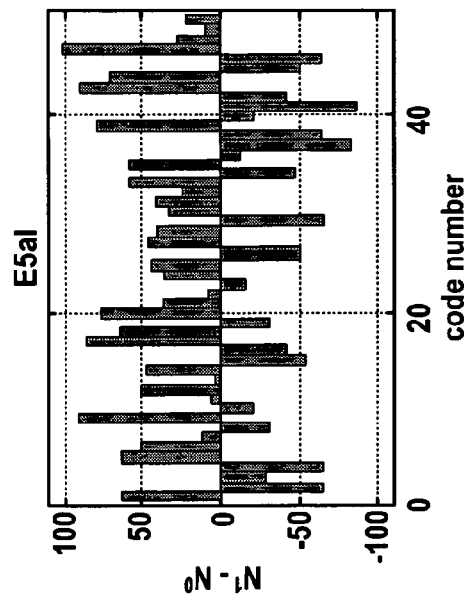
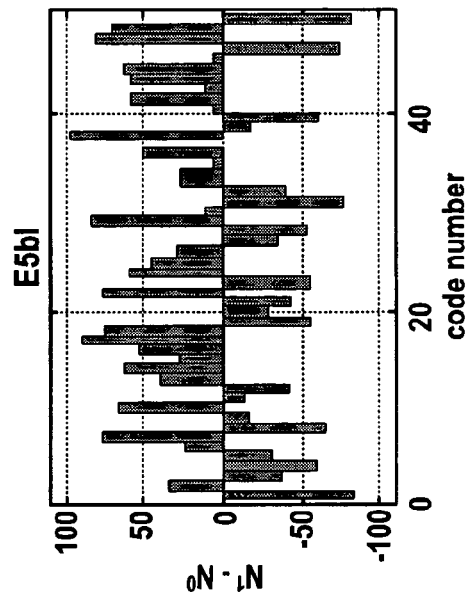
Fig. 2

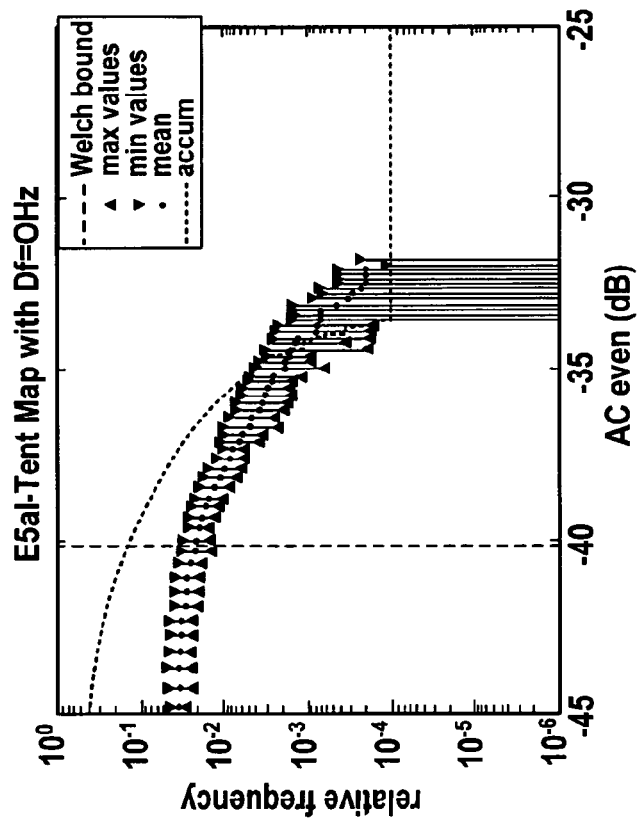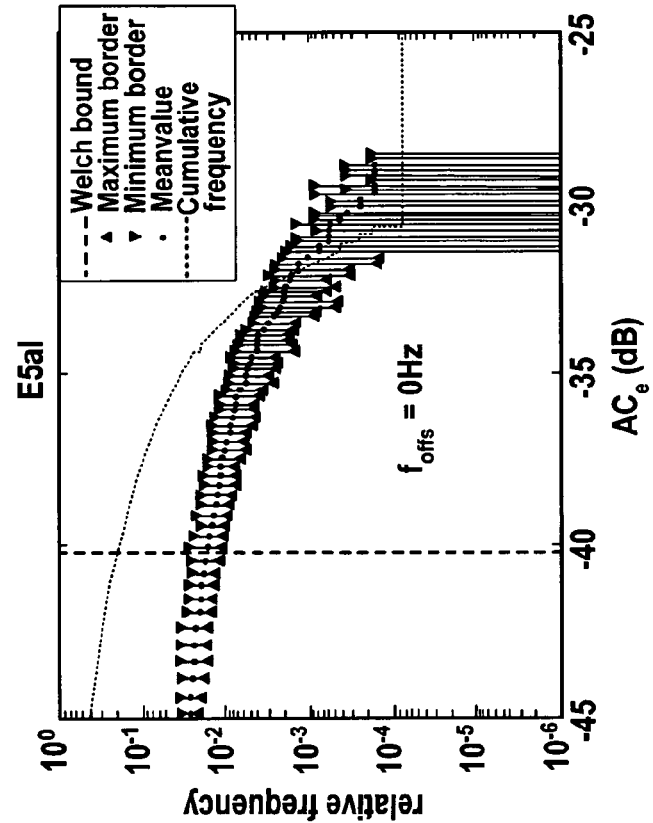
Fig. 4

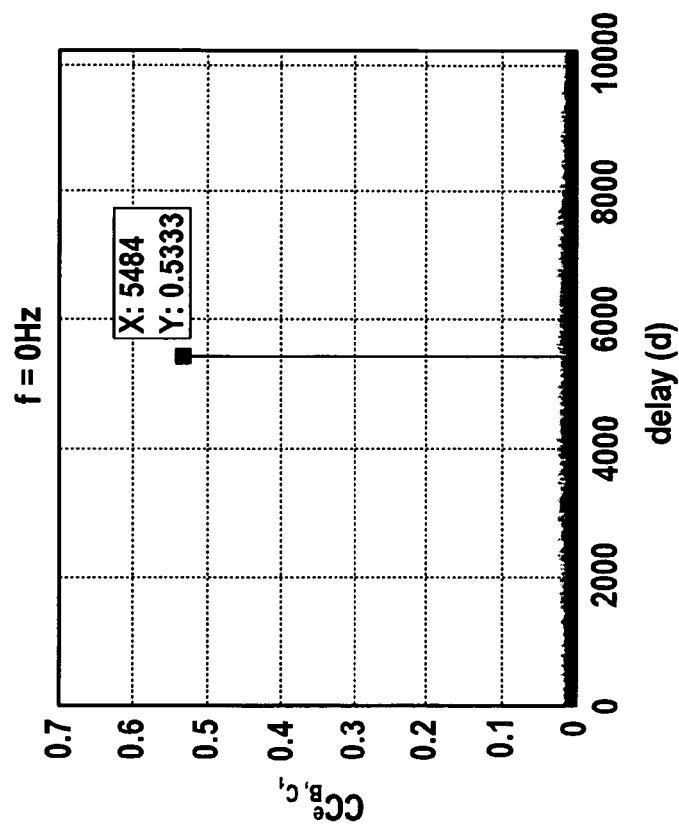
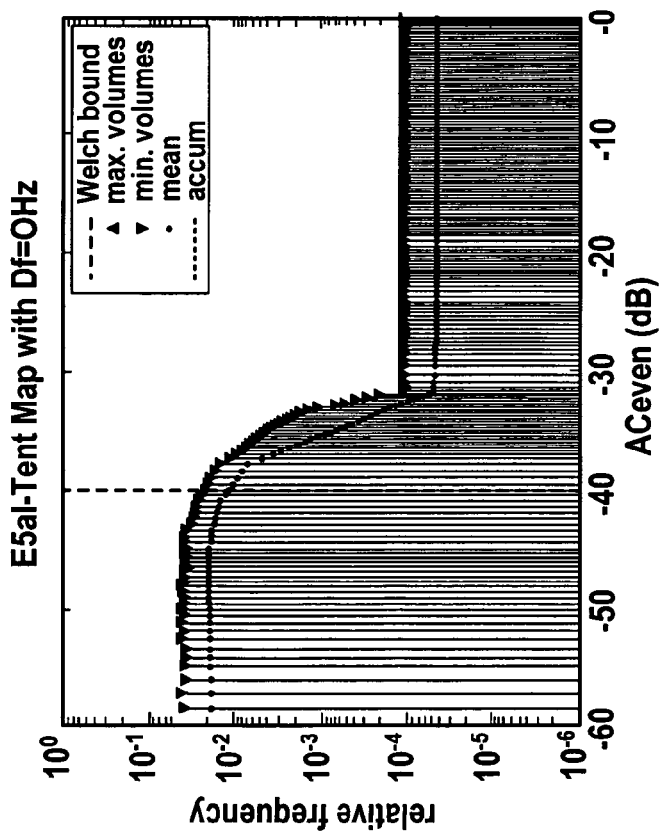
Fig. 5

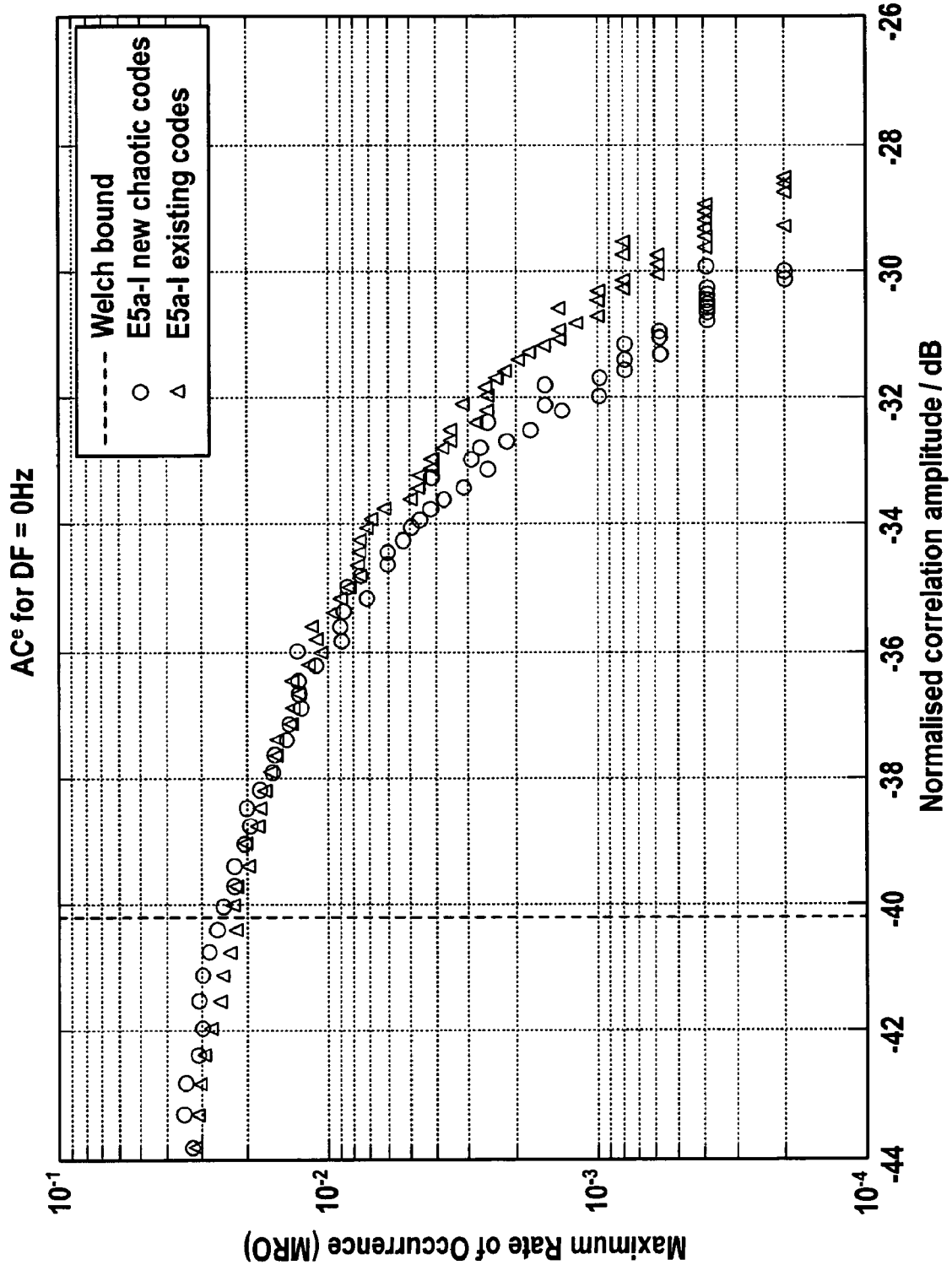

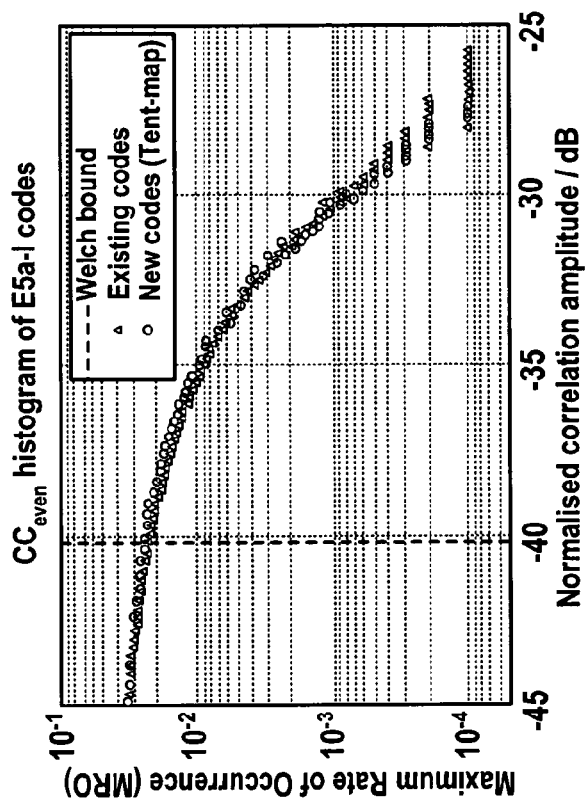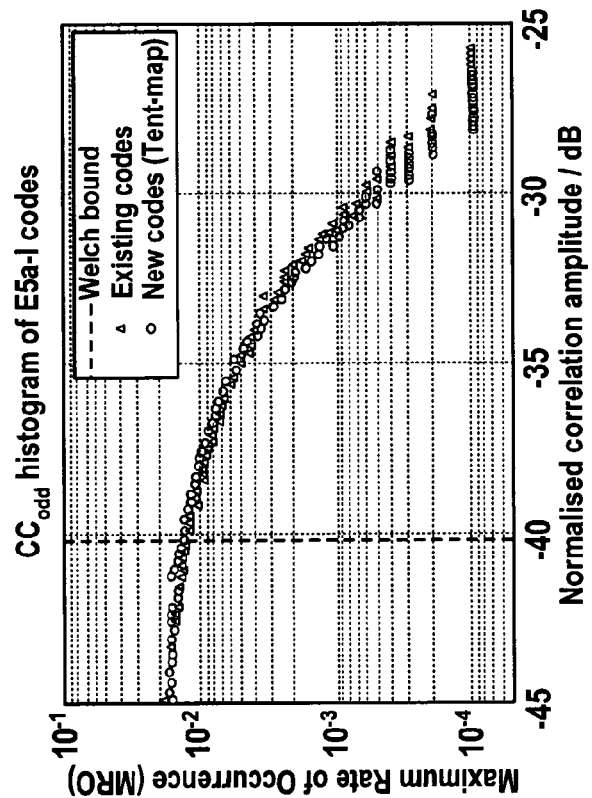
Fig. 7

CHAOTIC SPREADING CODES AND THEIR GENERATION

TECHNICAL FIELD

The present invention relates to chaotic spreading codes, in particular a method for generating a set of chaotic spreading codes having autocorrelation and cross-correlation properties suitable for satellite navigation systems and CDMA communication systems.

BACKGROUND ART

Satellite radio navigation offers wide-range and precise positioning services with guaranteed reliability, thanks to the state-of-the-art technologies adopted by the existing GPS system. In a few years time, these will be further enhanced by the introduction of the European Galileo satellite navigation constellation, an initiative launched by the European Union and the European Space Agency (ESA). Galileo along with the upcoming third generation GPS III are expected to ensure wider coverage and more precise time and location positioning facilities. However, ensuring such services requires careful reconsideration of different navigation signal parameters such as modulation scheme, navigation message structure and spreading codes design.

The use of spreading codes makes signals appear wide band and noise-like. It is this very characteristic that makes these signals difficult to intercept, hard to jam and unlikely to interfere with narrowband signals. Therefore, spreading codes play an important role in ensuring a reliable and secure transmission, without producing significant interference with other signals. In spread-spectrum multiple access transmission, such as Direct Sequence Code Division Multiple Access (DS-CDMA) and satellite navigation systems, different signals are assigned different codes and the receiver recovers the desired user's signal by making use of the knowledge of the corresponding spreading code. These spreading codes are desired to have delta-peak-like autocorrelations for an accurate synchronization and low cross-correlations in order to reduce co-channel interferences. Conventional Linear Feedback Shift Register (LFSR) sequences are the most known and studied pseudo-random binary codes in literature and largely used in various applications such as DS-CDMA and satellite navigation systems.

With regard to the future Galileo satellite navigation system, there is a need to generate new codes in addition to the baseline codes already described in the SIS ICD [1] and assessed in Phase C0 document [2]. Assessment of the baseline codes will require direct comparison with other codes and code sets. Most of the codes described previously, such as the existing E5 Galileo codes, suffer from problems due to truncation from their maximal length. Thus, one should generate codes which have maximal length that is not restricted to a value $2^N-1$, for some N. Many codes have been proposed which, in theory, may outperform standard linear feedback shift register-based codes. Thus these codes are worthy of investigation as potential alternatives to the baseline codes, and may be considered for deployment in a flexible Galileo architecture.

The baseline Galileo codes, are either memory or combined and truncated maximum length sequences (m-sequences). Undeniably, m-sequences are easy to be generated and possess perfect autocorrelation behavior. However, besides the typical moderate cross-correlation performance of m-sequences, the truncation process, required to ensure the desired code length, destroys the perfect autocorrelation behavior of such sequences and has an adverse effect on their performance. Conversely, the memory codes can be optimized to have better performance but are difficult to generate on-chip in real-time and hence have to be stored in memory. Therefore, the investigation of alternative schemes such as chaotic codes, which could offer better performance and ease of implementation, would certainly be in the interest of the spread spectrum community.

One of the problems with pseudo-random codes is their generation. The PRN codes generated by digital signal processors tend to be periodic due to the digital nature of the processors. There has been significant interest in recent years in exploiting chaotic generators to create spreading codes in Spread Spectrum systems [3-5]. The simplicity of these generators, the non-periodicity of the chaotic signals, their sensitivity to initial conditions and their flexibility in terms of length make these generators of significant interest in utilization e.g. in satellite navigation technology or communication technology. These chaotic codes have the benefits of simple implementation, broadband and noise-like appearance, improved transmission privacy, especially over standard m-sequences and Gold sequences, and robustness against channel imperfections like multipath propagation and jamming [3, 4]. Furthermore, the inclusion of chaotic code implementations which are not based on shift registers allows one to generate spreading codes of arbitrary length without the need for truncation. Recent results [5, 8-10] have demonstrated that suitable spreading code generators, based on chaotic maps, may be generated robustly and efficiently, in digital hardware. The high performance of such maps was investigated in [11], where it was also shown how these maps may be modified to yield near ideal correlation properties. Furthermore, the concept of the utilization of chaotic sequences with finite bits by means of a linear feedback shift register has been realized in [8-10] and an algorithmic approach of how to design a decimal m-sequence with prescribed autocorrelation function has been described in [11].

However, these studies are only suitable for maximal length sequences and are not suitable to arbitrary length codes such as found in Galileo. In fact, extensive simulations have been carried out, where numerous chaotic sets, based on above studies, have been generated and assessed. Despite the good autocorrelation behavior of such chaotic codes, the random process used in selecting these codes has caused unacceptably weak cross-correlation performance. Furthermore, Gold and Kasami strategies have been to overcome this drawback, however, since these two methods were initially proposed for m-sequences and not for chaotic codes, both failed to provide satisfactory cross correlation performance.

OBJECT OF THE INVENTION

It is an object of the present invention to propose a method of generating a set of spreading codes that overcomes the above-mentioned problems. This object is achieved by the method as claimed in claim 1.

GENERAL DESCRIPTION OF THE INVENTION

The method of generating a set of spreading codes, starts with the determination of first and second chaotic pseudo-random noise codes (seed codes) of the desired length, which have delta-peak-like autocorrelation functions and a low cross-correlation function. Although the meaning of the latter terms should be clear for those skilled in the art, a binary code exhibits a "delta-peak-like" autocorrelation function if its autocorrelation is 0, or at least close to 0 for all delays different from 0; similarly two codes are said to have low cross-correlation if their cross-correlation is 0 or close to 0 for all delays. Further pseudo-random noise codes are obtained by carrying out the steps:

(a) generating a further pseudo-random noise code by computing $$D_k = F(C_1) + T^k C_2 + F(C_2),$$

where k represents a positive integral index, $D_k$ represents the further pseudo-random noise code being generated, $C_1$ represents the first code, $C_2$ represents the second code, F represents a binary function based on basic binary operations and $T^k$ represents the operator that cyclically shifts a code by k chip positions (a "chip" denotes a "bit" of a pseudo-random noise code; however, the term "bit" usually infers that information is encoded);

(b) adding the code $D_k$ to the set of already determined pseudo-random noise codes if the code has a delta-peak-like autocorrelation and low cross-correlation functions with the pseudo-random noise codes already determined;

(c) discarding the code $D_k$ if the conditions for being added to the set of already determined pseudo-random noise codes of step (b) are not satisfied;

(d) modifying (incrementing or decrementing) index k and repeating steps (a)-(d) until the cardinal number of the set of determined pseudo-random noise codes reaches the cardinal number of the set of spreading codes to be generated.

Those skilled will appreciate that in the present method is not restricted to the generation of codes having a particular length but may be used for codes of arbitrary length. The code length may be fixed at the beginning by the choice of the initial two codes.

According to a preferred embodiment of the method, the first chaotic pseudo-random noise code is determined by generating a preliminary set of chaotic pseudo-random noise codes based upon an iterative chaotic map (such as e.g. a tent map, a split shift map, an n-way Bernoulli map) and choosing as the first chaotic pseudo-random noise code the code of the preliminary set that exhibits the best delta-peak-like autocorrelation function of the codes of the preliminary set.

The second chaotic pseudo-random noise code may then be determined by selecting from the preliminary set a code having delta-peak-like autocorrelation and whose cross-correlation with the first chaotic pseudo-random noise code exhibits only one predominant peak for a certain delay, hereinafter denoted L, the delay preferably corresponding to about half the code length, flipping the first L chips of the selected code and maintaining the remaining chips of the selected code.

Most preferably, the binary function F mentioned in step (a) is based on (cyclical) shifting and/or on flipping (i.e. inverting the order of a sequence of chips) and/or reversing. In case only these basic operations are used in the method, simple and low cost circuits may be used if the method is implemented in hardware.

As those skilled will appreciate, the generation of the preliminary set of chaotic pseudo-random noise codes may comprise emulating the chaotic map by an extended linear feedback shift register.

As discussed hereinafter in more detail, it has been shown that the sets of spreading codes obtained from the present method have better cross-correlation performance than the sets of spreading codes obtained from conventional methods. Given that lower correlation means lower interference and thus permits more efficient use of the available bandwidth, the present method is interesting for all areas related to the spread spectrum technology.

BRIEF DESCRIPTION OF THE DRAWINGS

Further details of the present invention will now be discussed with reference to the following figures, wherein:

FIG. 2 shows the balance of the codes E5a-I, E5a-Q, E5b-I, and E5b-Q;

FIG. 4 shows even autocorrelation histogram of (left) Existing Galileo E5a-I codes and (right) new tent map based codes;

FIG. 5 shows (left) even cross correlation histogram of the new tent map based codes and (right) cross correlation function between two randomly selected tent map codes;

FIG. 6a shows the maximum rate of occurrence (MRO) of even autocorrelation of a set of tent map codes based on the generation strategy according to the present method in comparison with existing Galileo E5a-I codes, at zero Doppler frequency (DF=0 Hz);

FIG. 7 shows even and odd cross correlation histograms of the tent map codes based on the generation strategy according to the present method;

DETAILED DESCRIPTION

Figure 8:
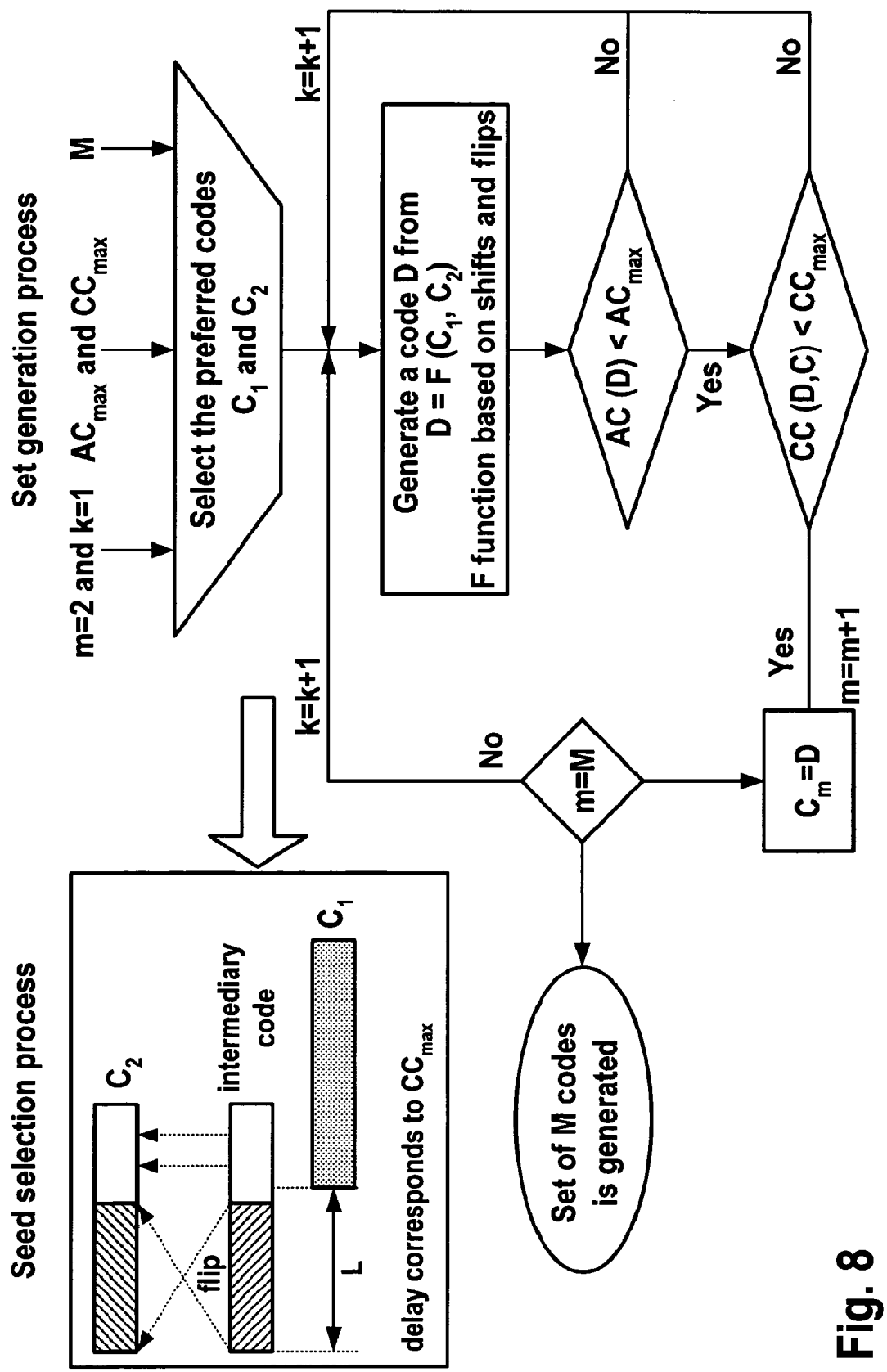
FIG. 8 shows a flow diagram of a preferred embodiment of a method according to the invention.

FIG. 8 illustrates the operation of a preferred embodiment of a method according to the present invention. First, the seed codes are determined by generating a number of preliminary chaotic codes of the desired length N based on an iterative chaotic map, such as the tent map or another of the maps mentioned hereinbefore. These preliminary chaotic codes are generated from randomly selected initial conditions and no specific constraints are used at this stage. From the preliminary chaotic codes obtained based on the tent map, the best code $C_1$ in terms of autocorrelation is chosen as the first seed code. The second seed code is then obtained by selecting from the preliminary codes another code ("intermediary code") having delta-peak-like autocorrelation and whose cross-correlation with the first seed code exhibits only one predominant peak for a certain delay L corresponding to about half the code length (L≈N/2). As illustrated in FIG. 8 by the insert named "seed selection process", the second seed code $C_2$ is then obtained from the intermediary code by flipping the first L chips thereof and keeping the remaining N-L chips.

Once the two seed codes $C_1$ and $C_2$ have been fixed, a further pseudo-random noise code $D_1$ is obtained by computing for k=1:

$$D_k = F(C_1) + T^k C_2 + F(C_2),$$

where F denotes in this case the operator that flips the entire code. In a more elaborate embodiment, the flipping of the entire code could be supplemented by other basic operators based on shifting and/or reversing (inverting the value of some chips). $T^k$ denotes the operator that cyclically shifts a code by k chip positions either to the left or the right.

The so-obtained code $D_k$ is added to the set of pseudo-random noise codes
- if the code has a delta-peak-like autocorrelation, i.e. $AC(D_k) < AC_{max}$, where $AC_{max}$ is the predetermined maximum allowed autocorrelation value for all delays different from 0,
- and if the code has low cross-correlation functions with the pseudo-random noise codes already determined, i.e. if for each code C already determined and for all delays: $CC(D_k,C) < CC_{max}$, where $CC_{max}$ denotes the predetermined maximum allowed cross-correlation value.

If one or both of the above conditions are not satisfied, the code $D_k$ is discarded, the index k is incremented by 1 and the above steps are carried out with the incremented value of k. After having added a code $D_k$ to the set of codes, it is checked whether the required number of codes M has been reached. If this is not the case, k is also incremented by 1 and the above steps are carried out again.

In the following some issues related to the existing Galileo E5 spreading codes, due to truncation from their maximal length, are highlighted and some results of a set of spreading codes obtained based on the tent map are presented.

Galileo E5 Spreading Codes

The Galileo E5-signal consists of the signals E5a, E5b and is transmitted in the frequency band 1164-1215 MHz allocated to RNSS with a worldwide co-primary status [2]. Both E5a and E5b consist of a data-channel, E5a-I and E5b-I signals, transmitted in the in-phase component and a pilot-channel, E5a-Q and E5b-Q signals, transmitted in the quadrature component. The main p allocated to the various Galileo E5 spreading codes for each signal component are stated in Table 1. These parameters include the code periods in milliseconds and the code lengths in chips for both so-called primary and secondary sequences.

TABLE 1

E5 Galileo signal components parameters [2]

| Signal Component | Code period (ms) | Code length (chips) | |
|---|---|---|---|
| | | Primary | Secondary |
| E5a-I | 20 | 10230 | 20 |
| E5a-Q | 100 | 10230 | 100 |
| E5b-I | 4 | 10230 | 4 |
| E5b-Q | 100 | 10230 | 100 |

The E5 spreading codes are generated by a tiered code construction, whereby a secondary code sequence is used to modify successive repetitions of a primary code [1]. The primary codes are truncated and combined M-sequences generated by Linear Feedback Shift Registers (LFSR).

E5 Primary Codes

Figure 1:
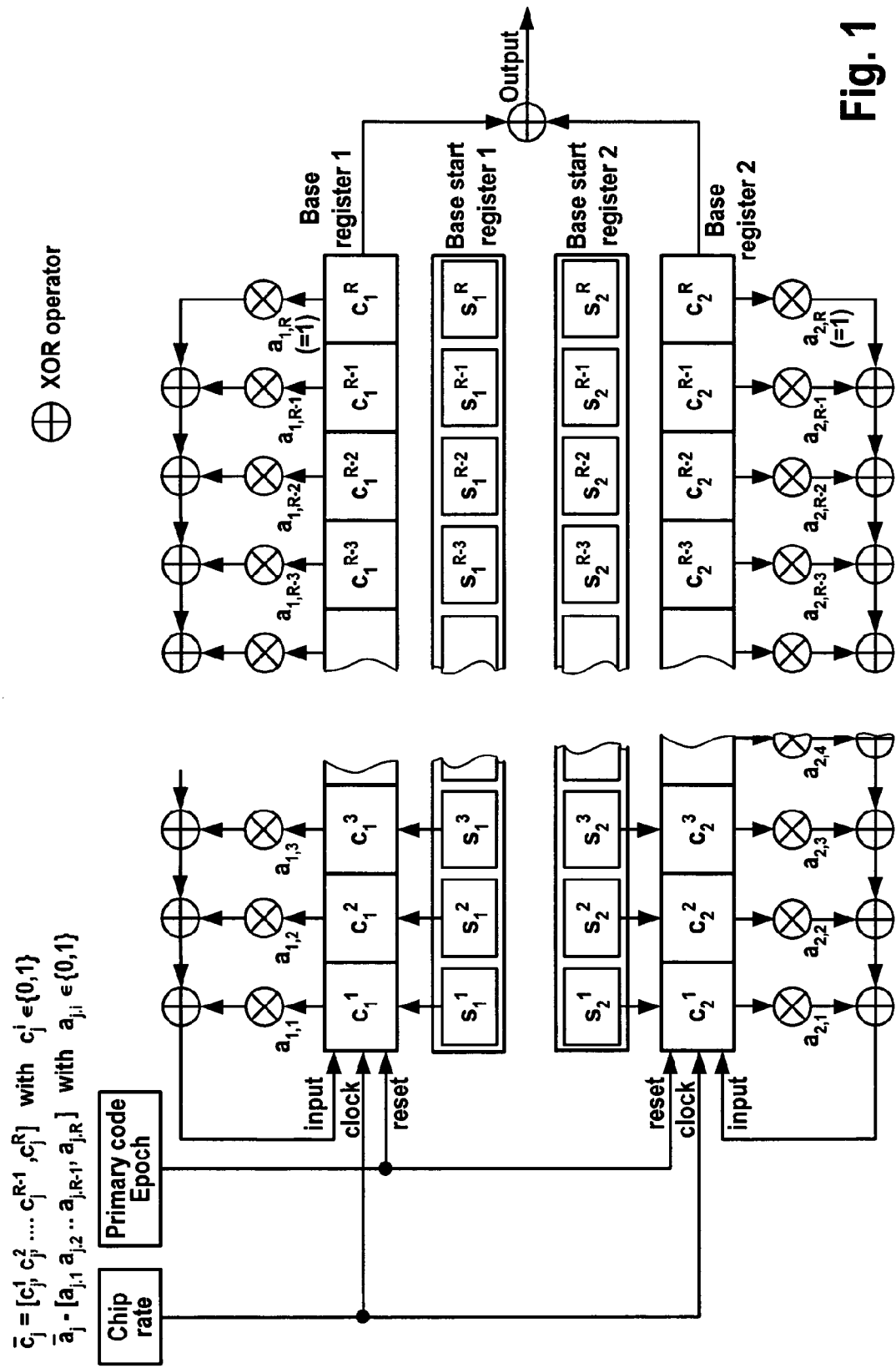
FIG. 1 illustrates a conventional LFSR-based code generator for Galileo E5 primary codes [1]

The E5a-I, E5a-Q, E5b-I and E5b-Q primary codes are basically truncated and combined M-sequences and generated by a simple technique based on two LFSRs [1]. In this technique two parallel shift registers base register 1 and base register 2 are used, as shown in FIG. 1. The primary code is simply the exclusive OR of base registers 1 and 2 outputs. In this specification, each shift register j (j=1 or 2) of length R is fed back with a particular set of feedback tap $a_j = [a_{j,1}, a_{j,2}, \ldots, a_{j,R}]$ and its content is represented by a vector $c_j = [c_c^1, c_j^2, \ldots, c_j^R]$, as illustrated in FIG. 1.

Each cycle, a new primary code-chip is generated and the new shift-register cell contents $c_j(k+1)$ for cycle k+1 are obtained from the contents $c_j(k)$ for cycle k as follows:

$$c_j^i(k+1) = \begin{cases} c_j^{i-1}(k) & \text{for } i = 2, \ldots, R \\ \mathrm{mod}\left(\left(\sum_{i=1}^{R} c_j^i(k) a_{j,i}\right), 2\right) & \text{for } i = 1 \end{cases} \quad (1)$$

The content of the two shift registers are reinitialized with start-values $s_j = [s_j^1, s_j^2, \ldots, s_j^R]$ after 10230 cycles. The duration of 10230 cycles is also called a primary code epoch. The start-values correspond to the content of the base-start registers 1 and 2 used to generate the 200 Galileo E5 primary codes can be found in [1].

In information theory the randomness is a vital criterion and an early indicator of the performance of the codes. In practice, no algorithm using a finite state mechanism can produce truly random sequences, since the finiteness forces the sequences to be periodic. However, sequences that closely emulate the randomness could be obtained and are known as pseudo-random sequences. There are many properties which have been derived in literature to measure the randomness of such pseudo-random sequences. The most used and recognized criterion is the Balance property. The balance property simply states that the number of zeros and ones should be as equal as possible per period.

As can be seen from FIG. 2, the spreading codes for E5 band are unbalanced. For example some codes show a relatively significant difference of around 100 more zeros than ones, or vice versa. The main reason behind this drawback is the truncation process performed on the two m-sequences (length $16383 = 2^{14} - 1$) at N=10230. Even though some codes have shown good balance hardly any of them has exhibited a perfect balance.

Correlation Calculus

Generally speaking, the cross-correlation between two different spreading codes (p and q), should be as small as possible in order to achieve good acquisition and tracking performances. This property should be maintained if the Doppler Effect is taken into account.

Consider the above two codes are defined by $\{a_{i,p}\}_{i=1}^{N}$ and $\{a_{i,p}\}_{i=1}^{N}$ of length N, where $a_{i,p}$ and $a_{i,q} \in \{-1,1\}$. At the receiver, the cross-correlation between the above two codes, considering the Doppler Effect, can be given by $$CC_{p,q}(d, f) = \frac{1}{N_p} \sum_{k=1}^{N_p} a_{k,p} a_{k-d,q} e^{2\pi j \frac{f}{f_s}(k-1)} \quad (2)$$

Where f is the Doppler frequency offset, d is the delay and $f_s$ is the sampling frequency.

The secondary codes used to generate the long Galileo E5 sequences render the cross correlation computation process unrealistic and time consuming. In order to overcome this problem the computation of the cross-correlation can be split up into the calculation of an even cross-correlation $CC^e$ and an odd cross-correlation $CC^o$ [2]. Therefore, the total cross-correlation can be given as a linear combination of odd and even cross-correlations:

$$CC_{p,q} = \alpha CC_{p,q}^e + \beta CC_{p,q}^o \quad (3)$$

The coefficients α and β, which represent the contribution amounts of both even and odd correlations respectively on the total correlation, can be accurately determined by careful analysis of the secondary codes' randomness properties. Nevertheless, the secondary codes usually are assumed to be random enough to consider that α=β. The latter assumption may not be compelling in all cases especially for secondary codes with small lengths. This issue is not addressed here and might be considered in future work.

FIG. 2 shows the autocorrelation histograms of the 50 E5a-I primary codes at different Doppler frequencies 0 Hz, 100 Hz and 6000 Hz. In these histograms the relative frequency or the rate of occurrence of certain correlation value represents the quotient of the number of how many times this value appears by the total number of correlation. For example if we assume a correlation value of a −35 dB occurs 15 times between two specific codes with N=10230, hence the relative frequency is simply 15/10230≈0.01466. The marks "∇" and "Δ" represent respectively the maximal and the minimal relative frequency. The vertical lines observed for some high correlations mean that at least one of the codes does not exhibit this correlation value. In other words, the minimum value for such correlation over the set of codes is zero and can not been represented in logarithmic scale. The Welch bound is the theoretical boundary towards we aim to shift all out of phase correlations and maximize the distance between them and the autocorrelation peak corresponds to zero delay.

Figure 3:
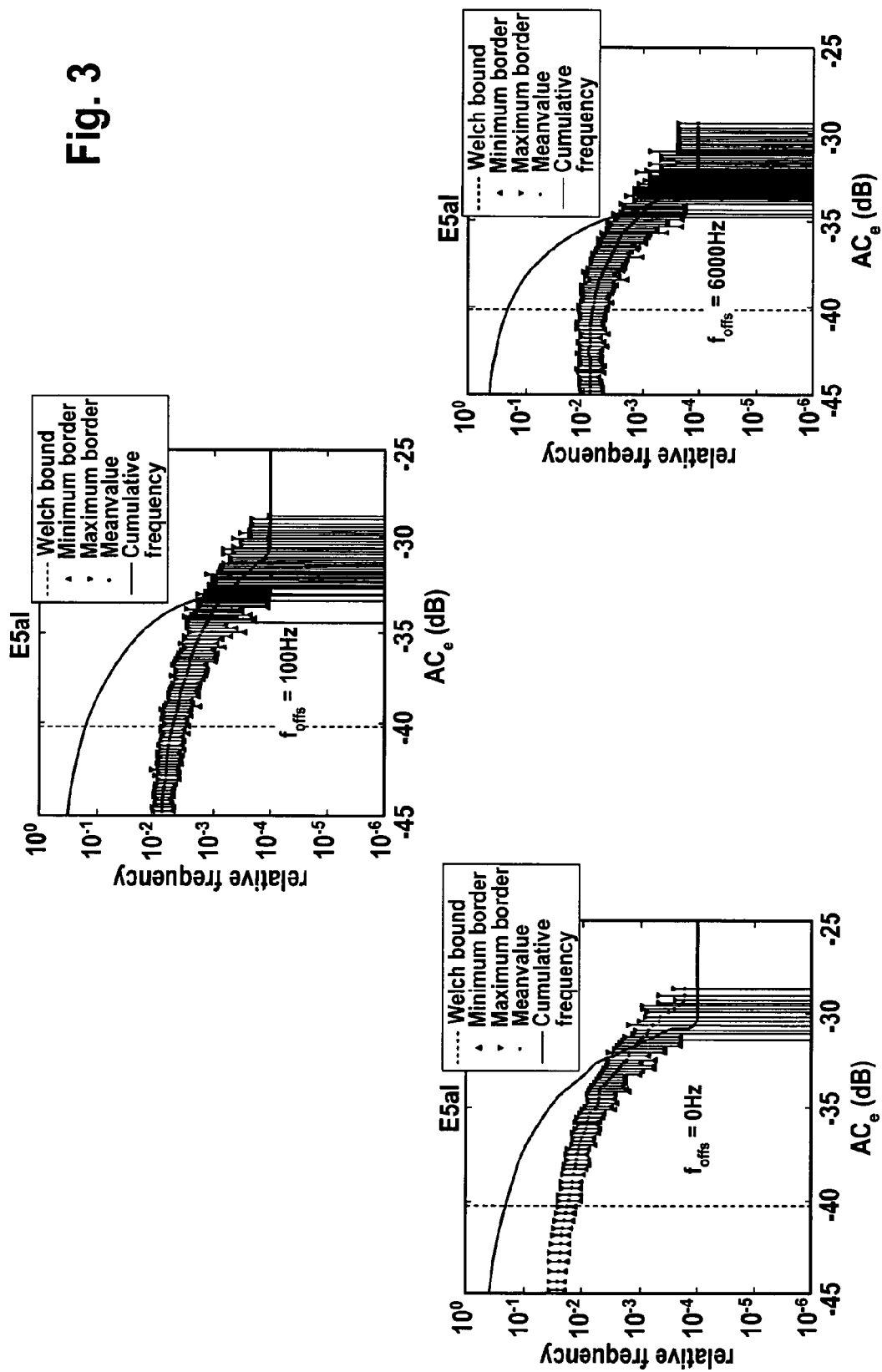
FIG. 3 shows Galileo E5a-I codes' even autocorrelation histograms for different Doppler offsets.

By analyzing the results shown in FIG. 3, the following observations can be made:

The number of possible autocorrelations increases significantly with the Doppler frequency offset, and the histogram becomes denser for high Doppler offsets compared to the coarse histogram for zero offset.

The relative frequency of any given autocorrelation value decreases when the Doppler offset increases.

The width of vertical lines at high correlation values become larger which means some of the high correlations are disappearing from some codes when the Doppler offset increases.

The maximum correlation value is shifting toward the Welch bound for higher offsets.

Therefore, the introduction of Doppler offsets makes the codes looking more random and shifts the maximum correlation value towards the Welch bound. In another term, the Doppler offset leads to some desirable codes characteristics.

New Chaotic Spreading Codes

Most of the codes described previously show sub-optimum correlation performance and suffer from problems due to truncation from their maximal length. In literature many codes have been proposed which, in theory, may outperform standard, linear feedback shift register-based codes such as the chaotic codes. This section is concerned with practical implementations of chaotic codes as possible future candidate as Galileo spreading codes. The chaotic codes are usually generated based on different maps such as tent maps, split shift maps, and n-way Bernoulli maps. Here we are only concerned with the implementation of the generation of chaotic spreading codes based on tent map.

Tent Map Codes

The tent map is a well-known chaotic map. It is given by:

$$x_{n+1} = \begin{cases} ax_n & 0 \leq x_n \leq 0.5 \\ a(1-x_n) & 0.5 \leq x_n \leq 1 \end{cases} \quad (4)$$

where $1<a<2$. For example, if we start with initial condition $x_0=0.1$, and $a=1.5$, we get the sequence 0.1, 0.15, 0.225, 0.3375, 0.50625, 0.740625 . . . . This is an infinite, non-repeating sequence with excellent correlation properties. If a is set to 2, then many initial conditions will yield periodic output, but it is centered on 0.5. Thus, for a given initial condition $0<x_1<1$, the sequence $x_1, x_2, \ldots$, generated from (4) can be used to generate a finite length spreading code $X_1, X_2, \ldots$ using $$X_j = \begin{cases} 1 & \text{if } x_j > 0.5 \\ 0 & \text{otherwise} \end{cases} \quad (5)$$

However, we would like to generate a chaotic sequence based on the tent map, but implemented using binary algebra (similar to standard linear feedback shift register implementations). Our approach of generating the Tent map is to devise an LFSR-based spreading code generator, then transform it into an approximation of the tent map (or extended LFSR, e-LFSR) [5], and then verify it by plotting the output of decimal representation, in similar manner to the procedure described in [5]. Based on the latter procedure a preliminary set of chaotic sequences of length 10230 have been generated and simulated by using an algorithm which takes as input the degree of shift register of an e-LFSR and a random initial state of the shift register.

FIG. 4 (right) illustrates the even autocorrelation histogram of a preliminary set of 50 tent map codes of length 10230, generated randomly based on the above procedure at zero Doppler frequency. The histogram on the left of FIG. 4 represents the even autocorrelation of the existing E5a-I codes. As we can see the tent map codes demonstrates better autocorrelation performance by a gain of around 4.5 dB. This result reflect how the new codes are good as individuals but not as a set. In order to assess mutual performance between the codes the cross correlation histogram are analyzed next.

FIG. 5 (left) even cross correlation histogram of the previously generated tent map based set. The right figure represents the cross correlation function between two randomly selected codes from this set. As can be seen very unacceptable high cross correlation values appeared which reflect the arbitrary codes choice performed in first place. More specifically the cross correlation between these codes shows almost similar pattern with one dominant cross correlation value.

Figure 6B:
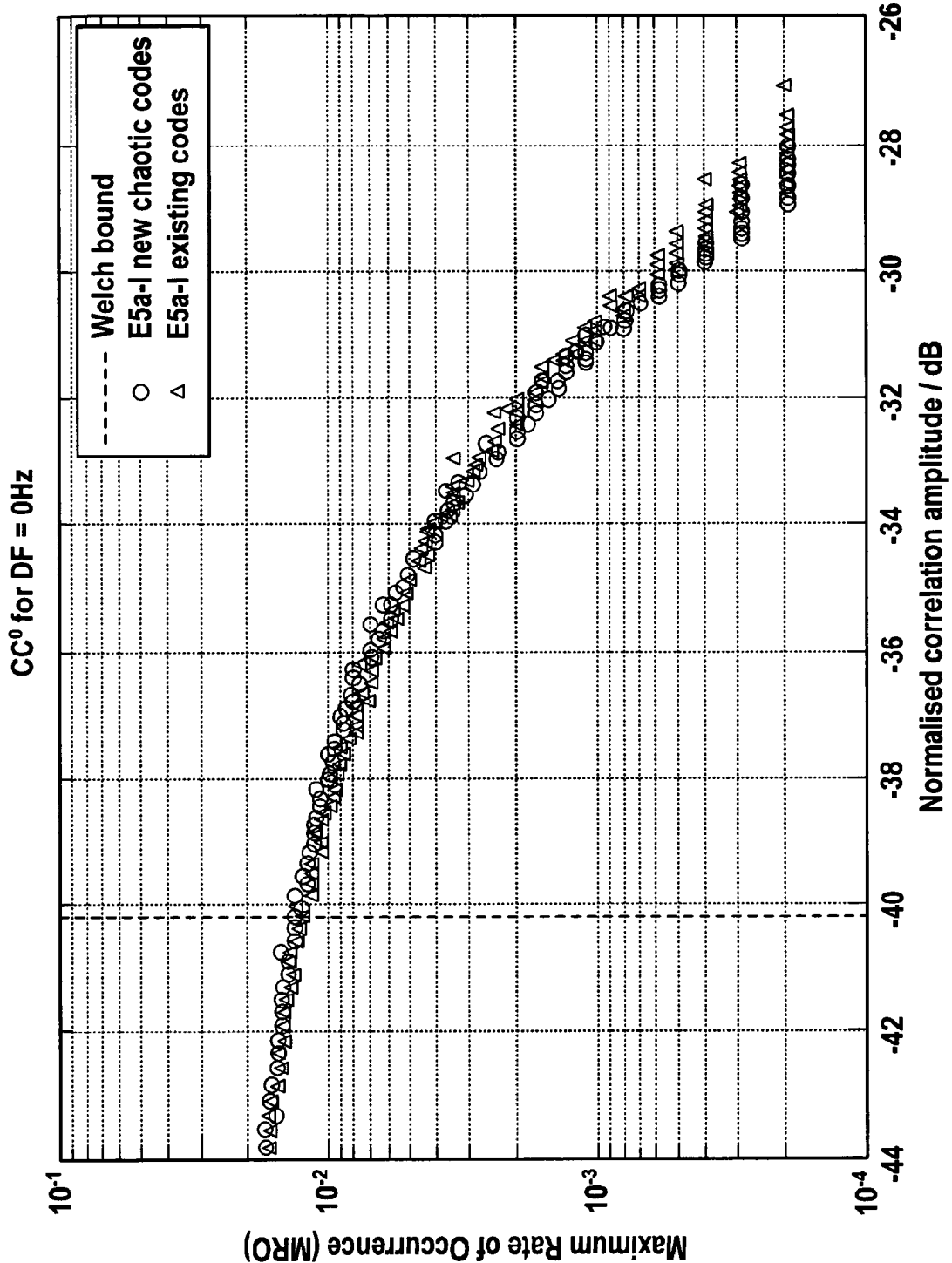
FIG. 6b shows the maximum rate of occurrence (MRO) of even cross-correlation of a set of tent map codes based on the generation strategy according to the present method in comparison with existing Galileo E5a-I codes, at zero Doppler frequency (DF=0 Hz)

This issue is overcome by the method described hereinbefore. In the following, an assessment of a new set of spreading codes designed for the E5 band, obtained from the method and based upon two seed codes generated using the tent map set is presented and discussed. A set of 50 chaotic codes has be generated using the method of the present invention, based on the tent map with a code length of 10230 chips. The new codes have outperformed the existing E5a-I Galileo codes in numerous tests including various cross- and auto-correlation calculations over a large range of Doppler frequencies and various selection criteria which assess tracking, acquisition and robustness performance. FIG. 6a shows the maximum rate of occurrence (MRO) of even autocorrelation, and FIG. 6b shows the even cross-correlation, of both new generated chaotic codes and existing Galileo E5a-I sequences, at zero Doppler frequency (DF=0 Hz). The desired performance is to shift all out of phase correlations towards the Welch bound as much as possible and maximize the distance between them and the autocorrelation peak corresponding to zero delay. As can be seen the new codes exhibit closer even/odd curves to the Welch bound than the existing E5a-I curves and show lower correlation values.

For more comprehensive comparison the whole selection process described in Phase C0 [2] and initially used to select the spreading sets for Galileo is considered next. This process includes five different metrics and the final weighting factor of the E5 band for user group A2 described in [12].

TABLE 2

Metrics Values of both Existing E5a-I Codes and the New Chaotic Set

| Criterion | Weighting factors | Metric value Existing | Metric value New | Normalised value Existing | Normalised value New |
|---|---|---|---|---|---|
| $AMEWSD_{MP}$ | 9% | 0.70986 | 0.68676 | −1.65% | +1.65% |
| $AMEWSD_{CT}$ | 36% | 0.71044 | 0.70796 | −0.17% | +0.17% |
| $AMF_{MP}$ | 4.5% | 4.102e-4 | 4.034e-4 | −0.83% | +0.83% |
| $AMF_{CT}$ | 40.5% | 1.00007 | 0.99998 | −0.005% | +0.005% |
| AELW | 10% | −2.83410 | −2.77975 | −0.97% | +0.97% |

Table 2 depicts the existing metric values of the baseline Galileo E5a-I codes and the new chaotic code set, where the weighting factors are determined by multiplying the user group A2 weighting factors and the relevant crosstalk or multipath weighting factors. As can be seen from this table the new chaotic set has outperformed the existing one over all five metrics. The best performance of the new codes is found on the $AMEWSD_{MP}$ criteria with 3.3% enhancement over the existing ones. The smallest improvement is on the AMF with an absolute improvement of 0.01%. The weighted metric is calculated and given in Table 3. It acts as the ultimate judge to decide which code set is preferred. As can be seen overall, based on the selection process used in Phase C0, the new set outperforms the existing one by a margin of 0.7%.

TABLE 3

Performance Comparison between E5a-I Existing and the New Set

| Codes set | Performance |
|---|---|
| Existing Galileo E5a-I set | −0.35% |
| New Tent map set | +0.35% |

REFERENCES

[1] D. Flachs, V. Oehler, S. Bouchired, E. E. Canalis, P. P. Muller-Remmers, M. Marinelli, H. De Gaujac, U. Gageur, and M. Falcone, "Galileo Signal In Space Interface Control Document (SIS-ICD), Ver. 10.1," *Galileo Industries* Sep. 28, 2005.

[2] S. Wallner, "Consolidated Code Design (TN ID31)," *Galileo Phase C0/CN001*, Nov. 10, 2004.

[3] V. Varadan and H. Leung, "Design of Piecewise Maps for Chaotic Spread-Spectrum Communications Using Genetic Programming," *IEEE Transactions on Circuits and Systems I: Fundamental Theory and Applications*, vol. 49, pp. 1543-1553, 2002.

[4] G. Mazzini, G. Setti, and R. Rovatti, "Chaotic complex spreading sequences for asynchronous DS-CDMA—Part I: System modeling and results," *IEEE Transactions on Circuits and Systems I: Fundamental Theory and Applications*, vol. 44, pp. 937-947, 1997.

[5] D. Yoshioka, A. Tsuneda, and T. Inoue, "On Transformation between Discretized Bernoulli and Tent Maps," *IEICE TRANS, Fundamentals*, vol. E88-A, 2005.

[6] R. Rovatti, G. Setti, and G. Mazzini, "Chaotic complex spreading sequences for asynchronous DS-CDMA—Part II: Some theoretical performance bounds," *IEEE Transactions on Circuits and Systems I: Fundamental Theory and Applications*, vol. 45, pp. 496-506, 1998.

[7] T. Kohda and A. Tsuneda, "Statistics of chaotic binary sequences," IEEE *Trans. Inf. Theory*, vol. 43, pp. 104-112, 1997.

[8] A. L. Baranovski, F. Dachselt, and W. R. "Nonlinear dynamics of PN-sequences," *Proceedings of the IST Mobile & Wireless Communications Summit* 2005, 2005.

[9] A. L. Baranovski, "On Generation of Chaotic M-Sequences," *Proceedings of the International Symposium on Nonlinear Theory and its Applications (NOLTA)*, Bruges, Belgium, 2005.

[10] D. Yoshioka, A. Tsuneda, and T. Inoue, "An algorithm for the generation of maximal-period sequences based on one-dimensional chaos maps with finite bits," *IEICE Trans. Fundamentals*, vol. E87-A, no. 6, pp. 1371-1376, June 2004.

[11] A. L. Baranovski and A. J. Lawrance, "Sensitive parameter dependence of autocorrelation function in piecewise linear maps," *International Journal of Bifurcations and Chaos*, 2006.

[12] F. Soualle, M. Soellner, S. Wallner, J.-A. Avila-Rodriguez, G. W. Hein, B. Barnes, T. Pratt, L. Ries, J. Winkel, C. Lemenager, and P. Erhard, "Spreading Code Selection Criteria for the future GNSS Galileo," *Proceedings of the GNSS* 2005, Munich, 2005.

The invention clamed is:

1. A method of generating a set of spreading codes, said set having a predefined cardinality, said method comprising:
   determining a set containing a first and a second chaotic pseudo-random noise codes, said first and second codes having delta-peak-like autocorrelation functions and a low cross-correlation function;
   determining further pseudo-random noise codes by carrying out the steps:
   (a) generating a further pseudo-random noise code by computing $$D_k = F(C_1) + T^k C_2 + F(C_2),$$

where k represents a positive integral index, $D_k$ represents the further pseudo-random noise being generated, $C_1$ represents the first code, $C_2$ represents the second code, F represents a binary function based on basic binary operations and $T^k$ represents the operator that cyclically shifts a code by k chip positions;
   (b) adding the code $D_k$ to the set containing said first and second pseudo-random noise codes if said code has a delta-peak-like autocorrelation and low cross-correlation functions with the pseudo-random noise codes already determined;
   (c) discarding the code $D_k$ if the conditions for being added to the set containing said first and second pseudo-random noise codes of step (b) are not satisfied;
   (d) modifying index k and repeating steps (a)-(d) until a cardinal number of the set of determined pseudo-random noise codes reaches the predefined cardinality of the set of spreading codes to be generated.

2. Method according to claim 1, wherein said first chaotic pseudo-random noise code is determined by generating a preliminary set of chaotic pseudo-random noise codes based upon an iterative chaotic map and choosing as said first chaotic pseudo-random noise code the code of said preliminary set that exhibits the best delta-peak-like auto-correlation function of the codes of said preliminary set.

3. The method according to claim 2, wherein said second chaotic pseudo-random noise code is determined by selecting from said preliminary set a code having delta-peak-like auto-correlation and whose cross-correlation with said first chaotic pseudo-random noise code exhibits only one predominant peak for a certain delay, hereinafter denoted L, said delay preferably corresponding to about half the code length, flipping the first L chips of the selected code and maintaining the remaining chips of the selected code.

4. The method according to claim 2, wherein said iterative chaotic map is at least one of a tent map, a split shift map, an n-way Bernoulli map.

5. The method according to claim 2, wherein generating said preliminary set of chaotic pseudo-random noise codes comprises emulating said chaotic map by an extended linear feedback shift register.

6. The method according to claims 1, wherein said binary function is based on at least one of shifting, flipping and reversing.

7. Method of using of a set of spreading codes generated according to the method of claim 1 in a CDMA system.

8. Method of using of a set of spreading codes generated according to the method of claim 1 in a satellite navigation system.

9. Computer program stored on a storage medium, said computer program contain computer-executable instructions for causing a computer to generate a set of spreading codes, said set having a predefined cardinality, by determining a set containing a first and a second chaotic pseudo-random noise code, said first and second codes having delta-peak-like autocorrelation functions and a low cross-correlation function;

determining further pseudo-random noise codes by carrying out the steps:

(a) generating a further pseudo-random noise code by computing $$+D_k=F(C_1)+T^k C_2+F(C_2),$$

where k represents a positive integral index, $D_k$ represents the further pseudo-random noise being generated, $C_1$ represents the first code, $C_2$ represents the second code, F represents a binary function based on basic binary operations and $T^k$ represents the operator that cyclically shifts a code by k chip positions;

b adding the code $D_k$ to the set containing said first and second pseudo-random noise codes if said code has a delta-peak-like autocorrelation and low cross-correlation functions with the pseudo-random noise codes already determined;

discarding the code $D_k$ if the conditions for being added to the set containing said first and second pseudo-random noise codes of step (b) are not satisfied;

(d) modifying index k and repeating steps (a)-(d) until a cardinal number of the set of determined pseudo-random noise codes reaches the predefined cardinality of the set of spreading codes to be generated.

* * * * *